US008001668B2

(12) United States Patent
Coffman, Jr. et al.

(10) Patent No.: US 8,001,668 B2
(45) Date of Patent: Aug. 23, 2011

(54) CONNECTOR INSTALLATION TOOL

(76) Inventors: Carl L. Coffman, Jr., Athol, ID (US); Michael J. Thomas, Athol, ID (US)

(*) Notice: Subject to any disclaimer, the term of this patent is extended or adjusted under 35 U.S.C. 154(b) by 413 days.

(21) Appl. No.: 12/292,610

(22) Filed: Nov. 21, 2008

(65) Prior Publication Data

US 2010/0125996 A1 May 27, 2010

(51) Int. Cl.
*B23Q 3/00* (2006.01)

(52) U.S. Cl. .................. 29/283; 29/270; 29/278; 269/3; 269/6

(58) Field of Classification Search .................... 29/283, 29/255, 207, 278, 242, 243, 244; 269/3, 269/6, 41, 166, 236, 95
See application file for complete search history.

(56) References Cited

U.S. PATENT DOCUMENTS 3,806,008 A 4/1974 De Lettre
4,012,548 A 3/1977 Roberti
D275,982 S 10/1984 Heijligers
4,599,779 A 7/1986 Thibault
4,722,316 A 2/1988 Stinett et al.
4,913,677 A 4/1990 Brasier et al.
5,005,813 A * 4/1991 Lawrence .................... 269/236
5,376,207 A 12/1994 Pittman
D364,905 S 12/1995 Krottner
5,806,380 A * 9/1998 Wilsey .......................... 81/3.09
5,863,033 A * 1/1999 Bradford .......................... 269/3
5,933,935 A * 8/1999 Alcorn ........................... 29/229
6,126,156 A * 10/2000 Brodeur .......................... 269/41
6,161,823 A * 12/2000 Bradford .......................... 269/3
6,272,951 B1 * 8/2001 Lambson .......................... 81/44
6,656,062 B2 12/2003 Vochezer
6,742,415 B2 * 6/2004 Scott .............................. 81/15.9
6,902,089 B2 6/2005 Carnevali
7,270,356 B2 * 9/2007 Roderick ..................... 294/19.1
7,546,691 B2 * 6/2009 Mackey .......................... 33/613
2002/0138915 A1 10/2002 Corsini
2007/0045599 A1 3/2007 Bilyeu et al.
2010/0125996 A1 * 5/2010 Coffman et al. ................ 29/283

FOREIGN PATENT DOCUMENTS

CA 2505063 10/2006

* cited by examiner

*Primary Examiner* — Lee D Wilson
(74) *Attorney, Agent, or Firm* — Richard C. Litman

(57) ABSTRACT

The connector installation tool is an elongate, substantially flat Y-shaped body having a base, a pair of spaced first and second bracket holding jaws projecting upwardly from the base, an elongate handle extending downwardly from the base, and an adjustable abutment spanning perpendicular to the bracket holding jaws, the abutment and jaws defining a bracket holding space therebetween. The connector installation tool presets the proper positioning of the bracket, resulting in more reliable, fast, safe and accurate installation of the connector.

16 Claims, 11 Drawing Sheets

CONNECTOR INSTALLATION TOOL

BACKGROUND OF THE INVENTION

1. Field of the Invention

The present invention relates to construction tools, and more specifically to a connector installation tool configured to allow one-handed operation of installing wooden studs, floor joists, ceiling rafters, hip rafters, trusses, solid sawn, bci style I-beams and beams (hereinafter referred to as framing element) in a safe, fast and accurate manner.

2. Description of the Related Art

In the construction industry, setting up the framework for a building or a home involves many repetitive layout and measuring of the framing elements. Once the layout is completed, the framing elements must be installed. Currently, Simpson™ tie straps are common connectors or brackets employed to hang joists and rafters. These straps are generally metal, U-shaped brackets B of various sizes having outwardly extending flanges F with holes H for nails to mount the bracket B to a stud or framing element S. (See FIG. 1). They are manually or pneumatically installed, and depending on the complexity and scale of the project, it is a time consuming process. Moreover, due to the design of these brackets, they are susceptible to mishandling, and ultimately, inaccurate installation through human error from having to individually place the bracket by hand, especially in difficult to reach areas.

Thus, a connector installation tool solving the aforementioned problems is desired.

SUMMARY OF THE INVENTION

The connector installation tool includes a substantially Y-shaped body having a base, spaced bracket holding jaws extending from one side of the base to define a bracket holding space therebetween, an adjustable abutment spanning the jaws adapted to hold the bottom portion of a bracket thereon and to abut a framing element at a predefined location, and a handle portion to be securely gripped by a user. The connector installation tool eliminates the necessity of manipulating each bracket in the proper layout position prior to mounting the same due to the tool's capability of being preset to hold the bracket at the proper and accurate dimensions relative to the framing element on which the bracket will be mounted.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
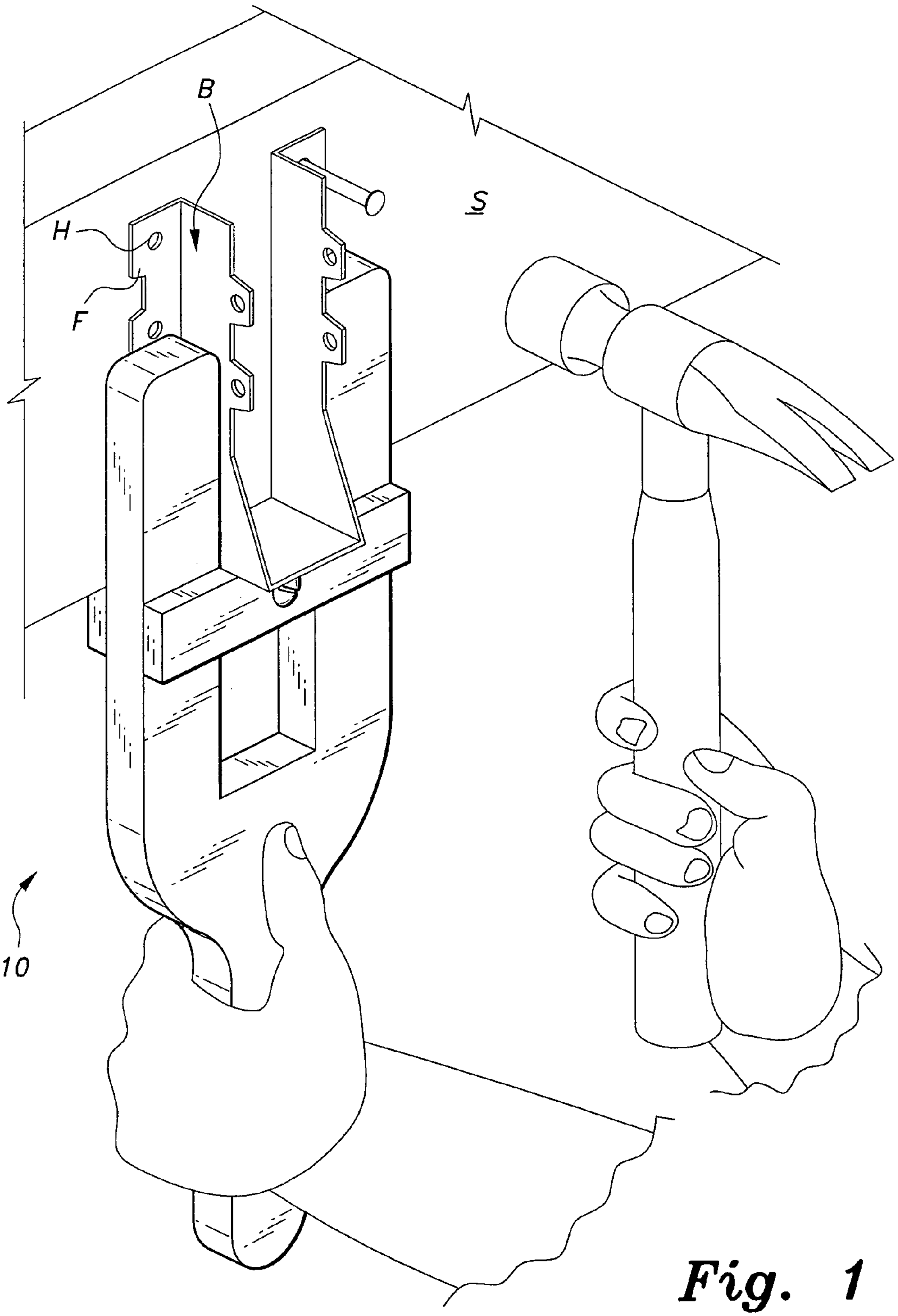
FIG. 1 is an environmental, perspective view of a connector installation tool according to the present invention.

The present invention relates to a connector installation tool 10 configured to ease installation of framing element brackets in a fast, safe, reliable and accurate manner. As shown in FIGS. 1-4, the connector installation tool 10 includes an elongate substantially flat, Y-shaped body having a base 13, a pair of spaced first and second bracket holding jaws 12, 14 projecting upwardly from the base 13, and an elongate handle 20 extending downwardly from the base 13. A vertically adjustable abutment 16 spans perpendicular to the bracket holding jaws 12, 14. The spacing of the jaws 12, 14 correspond to the width of a standard bracket B, and together with the top surface of the abutment 16, a bracket holding space 15 is formed therebetween.

Figure 2:
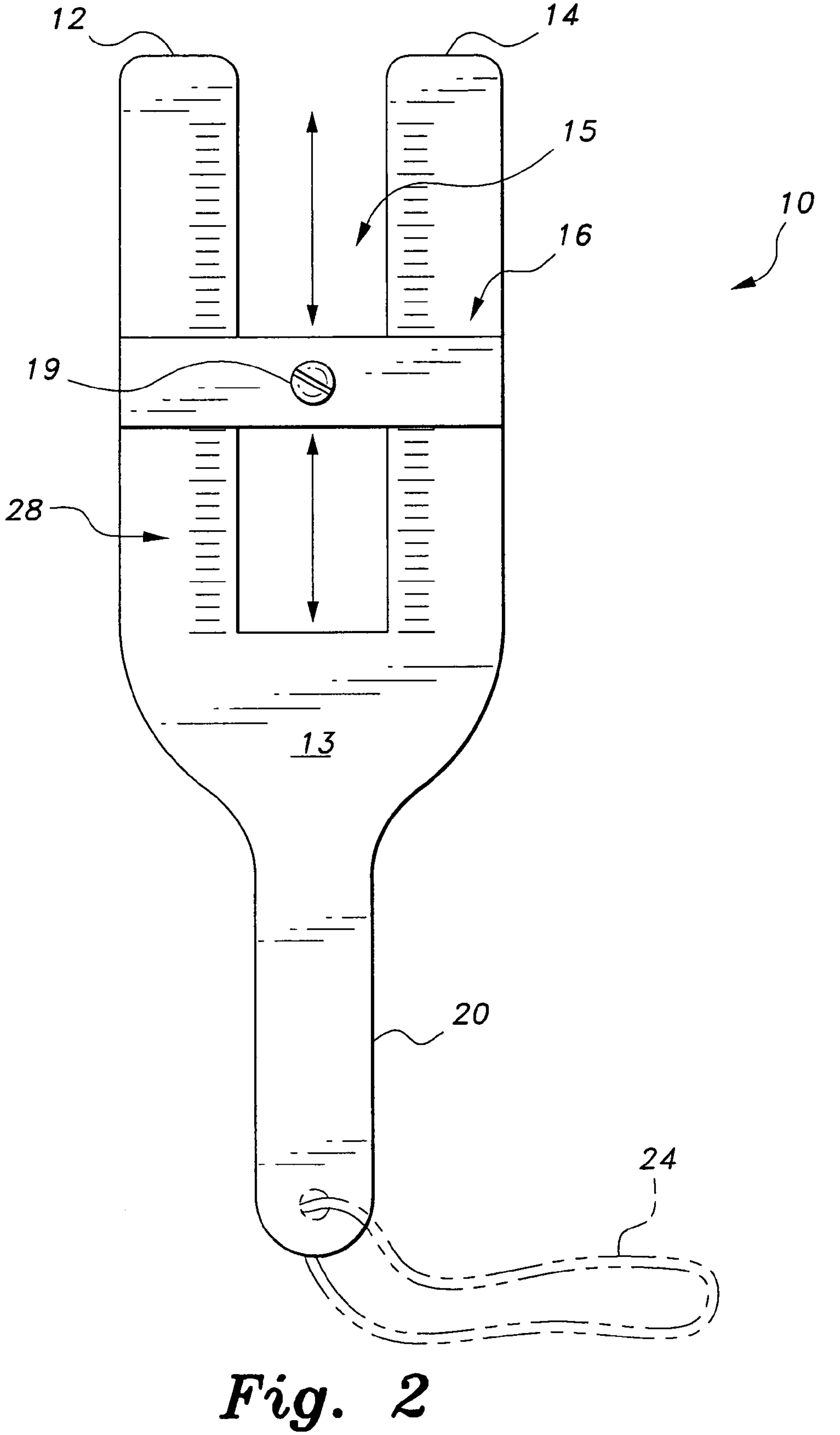
FIG. 2 is a front view of the connector installation tool according to the present invention.
Figure 3:
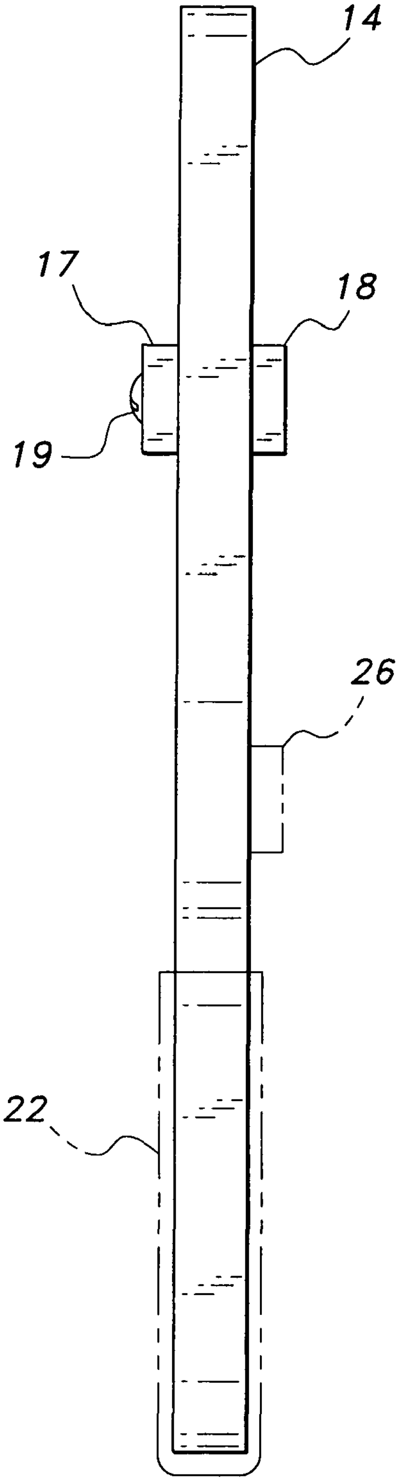
FIG. 3 is a side view of the connector installation tool according to the present invention.
Figure 4:
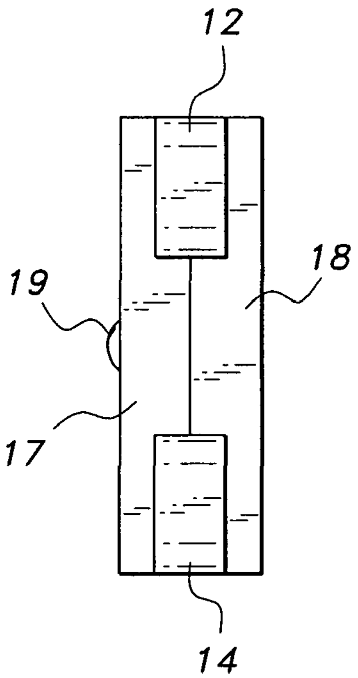
FIG. 4 is a top view of the connector installation tool according to the present invention.

Referring to FIGS. 2 and 4, the adjustable abutment 16 includes first and second abutment blocks 17, 18 selectively clamped together by a fastener 19. Each of the abutment blocks 17, 18 are T-shaped and disposed mirror image to each other. The spacing between the Ts forms opposing grooves that respectively accommodate first and second bracket holding jaws 12, 14 and permits the adjustable abutment 16 to ride along the jaws whenever adjustment is required. It is to be noted that the adjustable abutment 16 extends beyond the front and back surfaces of the body. (See FIG. 4). This serves two purposes. One is to provide a secure abutment surface for the bottom of the bracket B, and the other is to reliably and accurately abut the connector installation tool 10 against the framing element S. (See FIG. 1). This configuration also allows either front or rear sides of the tool 10 to be used. With respect to the first and second abutment blocks 17, 18, these may be modified so that one of the blocks is an elongate rectangular block while the other is a longer T-shaped block. Moreover, the adjustable abutment 16 may include more than two blocks to form the same, e.g. two elongate rectangular blocks and a central block interconnected to the rectangular blocks. The fastener 19 that clamps the abutment blocks 17, 18 may be biased for quick release selective clamping.

The following describes how the connector installation tool 10 is employed. Referring to FIG. 1, the user adjusts the abutment 16 to a preferred or predefined location along the first and second jaws 12, 14 by loosening the fastener 19, sliding the abutment 16 to the desired location, then tightening the fastener to securely clamp the first and second abutment blocks 17, 18 at the desired position. The bracket B is then placed in the bracket holding space 15, and the connector installation tool 10 is abutted against the framing element S at a predefined position along the framing element S. Nailing the same in place completes installation of the bracket B. Note in FIG. 1 that upper portions of jaws 12, 14 function as surrogate fingers to securely hold the bracket B in place for subsequent nailing operation. The above steps are repeated until the project is complete.

Thus, with the connector installation tool 10, no other manipulation or handling of the bracket B is required to install the same except for the initial insertion or placement of the bracket onto the tool. This reduces the chances to accidentally bend the upright portions of the bracket B that might potentially result in faulty or inaccurate installation, it reduces potential injury to the user's fingers since the connector installation tool 10 is holding the bracket B, and the tool presets the proper positioning of the bracket B resulting in more accurate installation of the connector.

While the above describes one version of the connector installation tool 10, the connector installation tool encompasses a variety of alternatives and features. For example, the connector installation tool 10 may be made from steel, plastic, wood or any other durable material. It may also be flexible to allow access to some hard to reach spots. Either bracket holding jaws 12, 14 or both may be provided with indicia 28 for more accurate adjustment of the abutment 16. To prevent dropping of the installation tool 10, the handle 20 may be provided with a hole for a lanyard 24 to be threaded therethrough. The handle 20 may also be wrapped by an ergonomic, no-slip cover for comfortable handling. When a project involves steel joists, the connector installation tool may be provided with a magnet 26 so that the tool may easily be attached to the steel joist.

The following describes other alternative connector installation tools according to the present invention. They all perform the same easy, fast, reliable, safe and accurate installation of connectors.

Figure 5A:
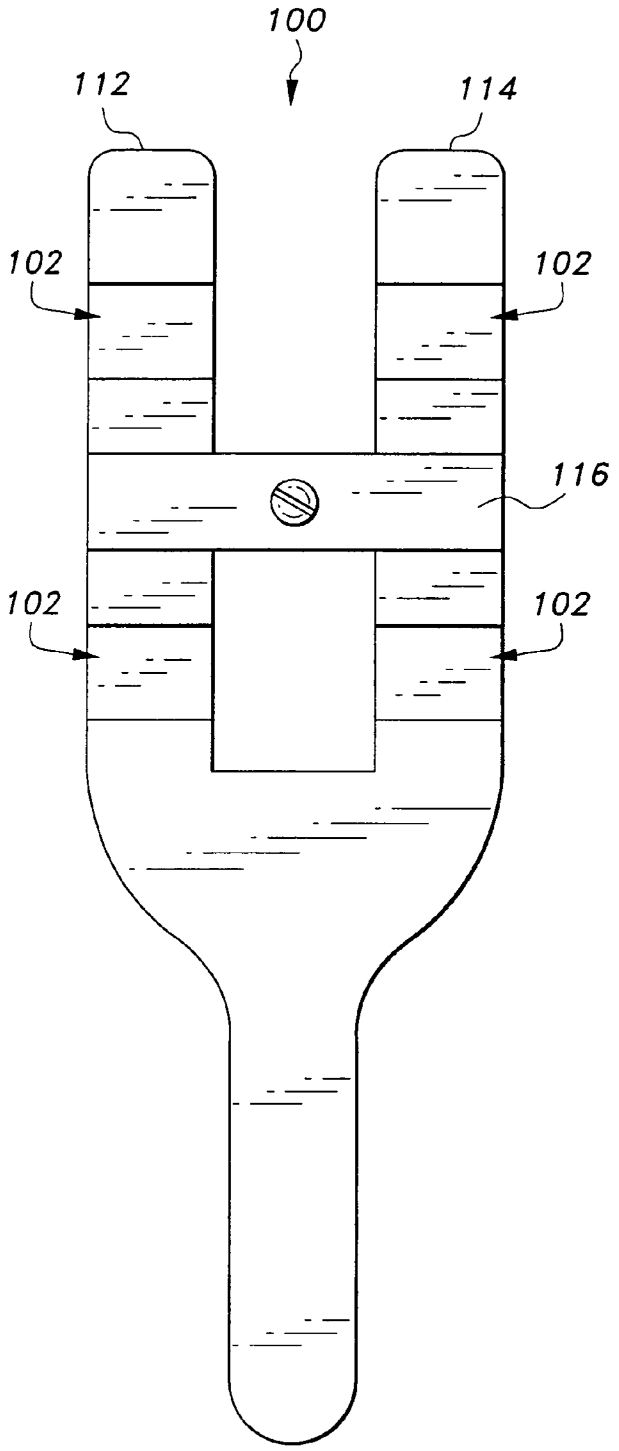
FIG. 5A is a front view of an alternative connector installation tool showing predefined notches for adjustable setting of the adjustable abutment according to the present invention.
Figure 5B:
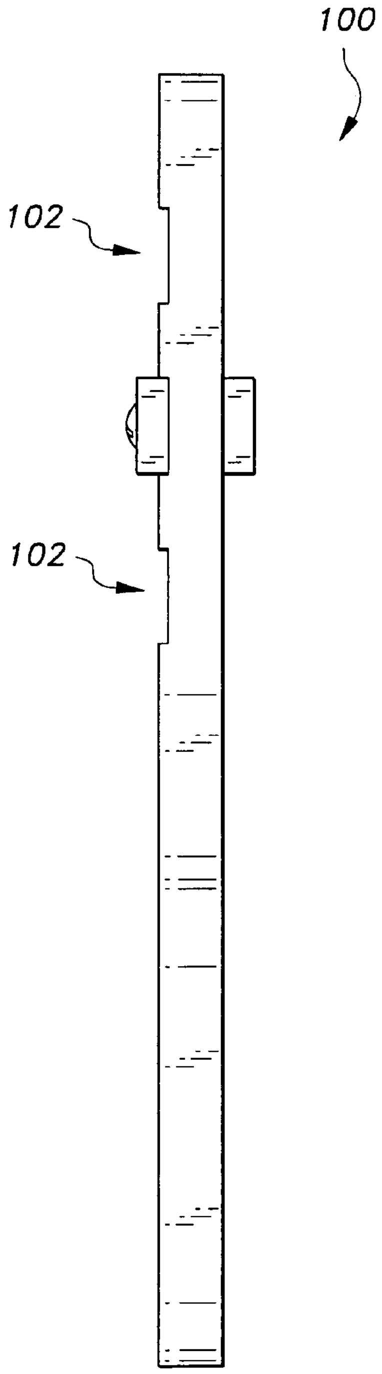
FIG. 5B is a side view of the alternative connector installation tool shown in FIG. 5A according to the present invention

In FIGS. 5A-5B, the alternative connector installation tool 100 includes adjustment notches or grooves 102 disposed at predetermined intervals along the length of the first and second bracket holding jaws 112, 114. This configuration permits the adjustable abutment 116 to be adjusted to predefined positions.

Figure 6:
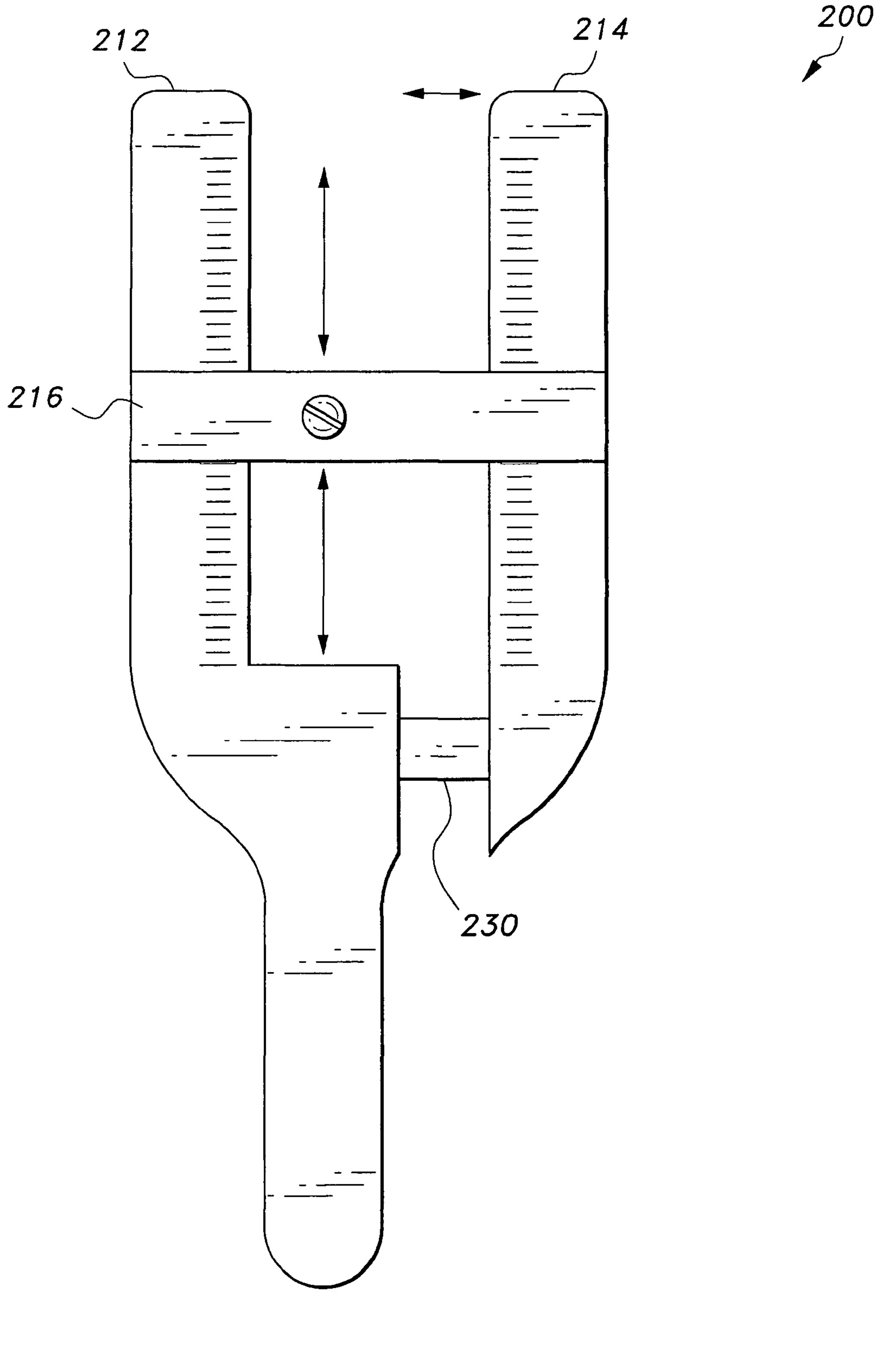
FIG. 6 is a front view of another alternative connector installation tool with an adjustable bracket holding jaw according to the present invention.

In FIG. 6, the alternative connector installation tool 200 includes a longer adjustable abutment 216 and one of the bracket holding jaws 212, 214 being laterally adjustable. An adjustment stabilizing bar 230 extends from the bottom portion of the adjustable bracket holding jaw 214, and it is slidably mounted to the base of the connector installation tool 200 to provide overall stability to the tool. This embodiment permits installation of a variety of standard sized connectors of various widths.

Figure 7:
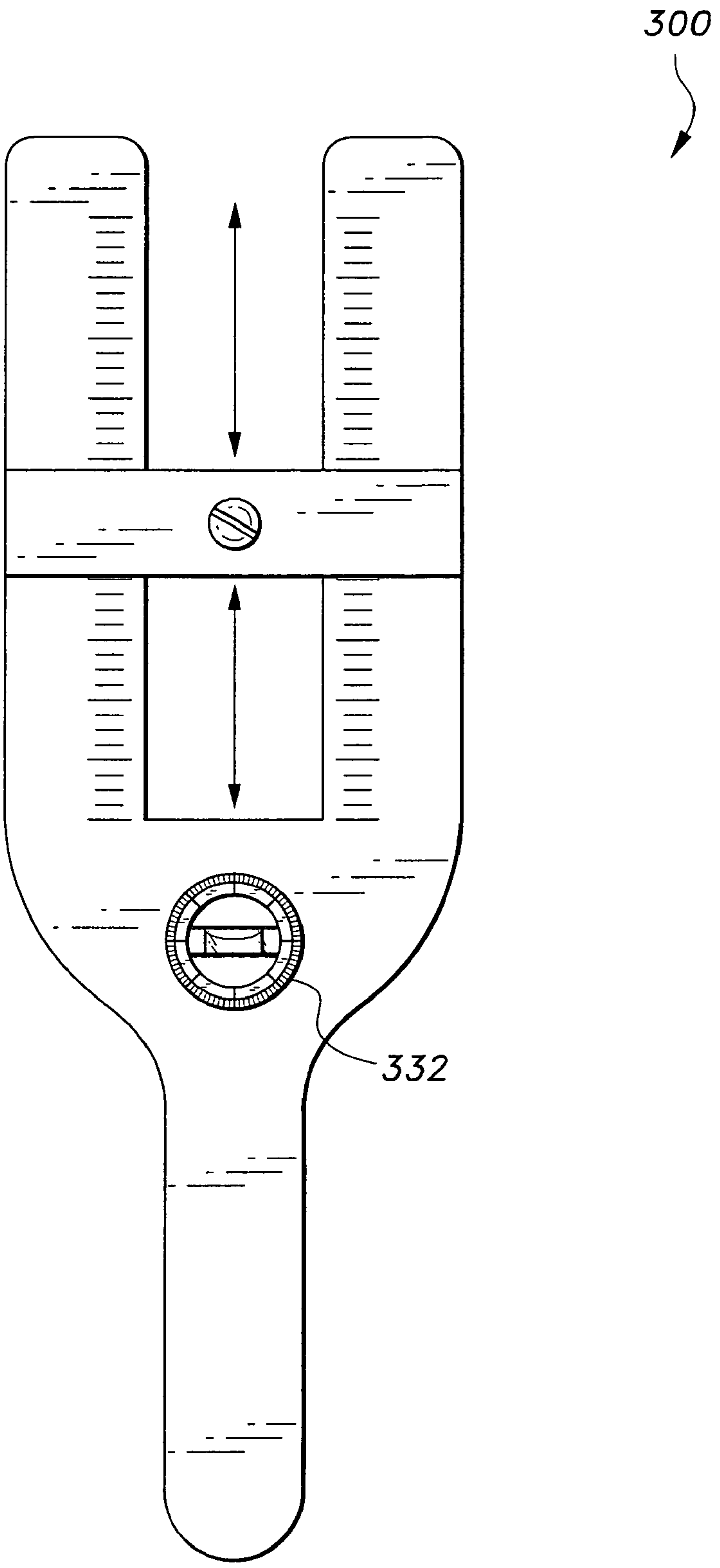
FIG. 7 is a front view of a further alternative connector installation tool with an angle finder according to the present invention.

In FIG. 7, the alternative connector installation tool 300 includes an angle finder 332 mounted to the base of the tool. This configuration insures accurate placement of the connector for joists disposed at an angle, e.g. trusses.

Figure 8:
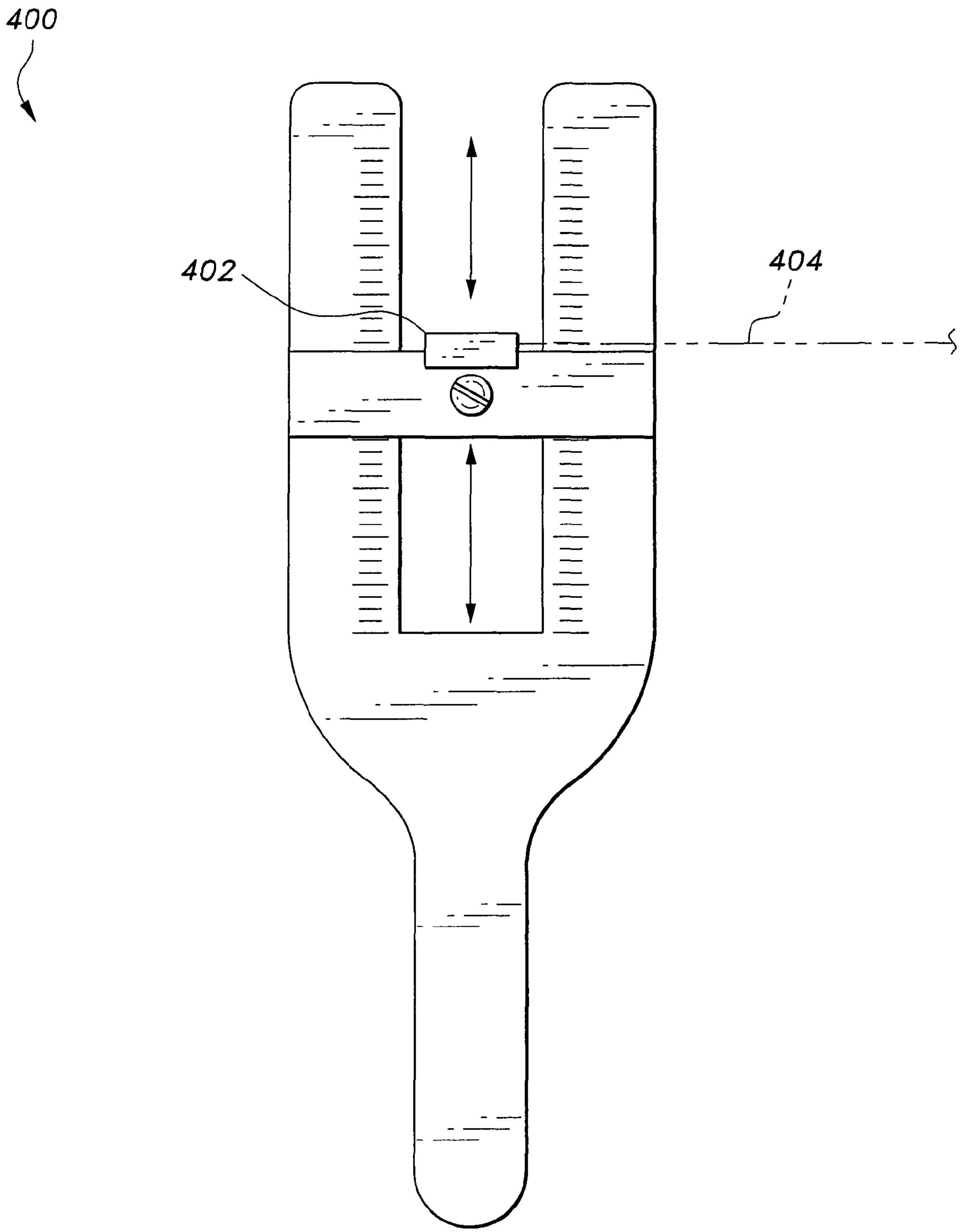
FIG. 8 is a front view of a still further alternative connector installation tool with a laser level according to the present invention.

In FIG. 8, the alternative connector installation tool 400 includes a laser level 402 that selectively projects a beam of light 404. This configuration permits accurate layout of brackets by providing a straight line guide for positioning the brackets and the framing elements.

Figure 9A:
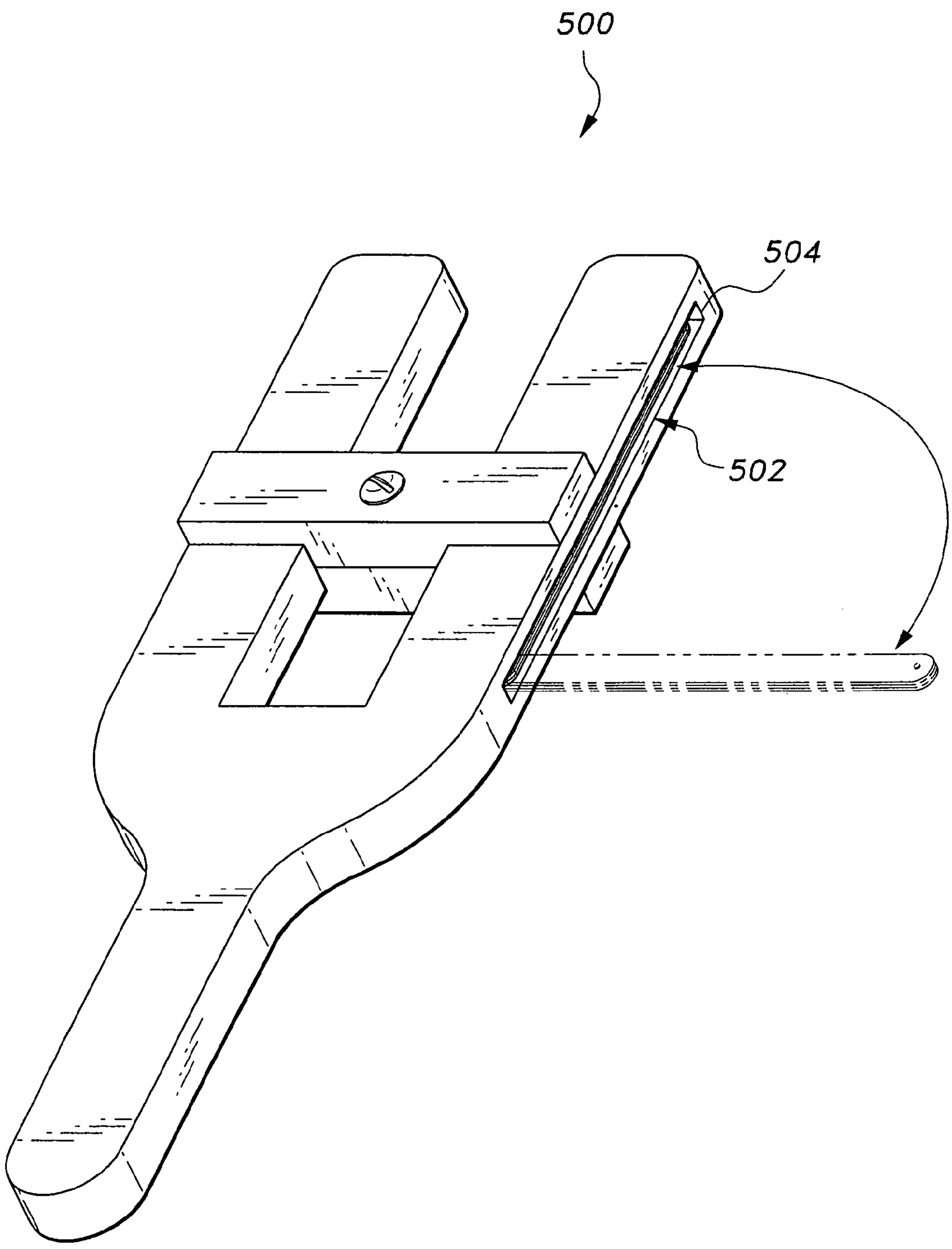
FIG. 9A is a perspective view of a still further alternative connector installation tool with a layout guide according to the present invention FIG. 9B of a front view of the alternative connector installation tool shown in FIG. 9A according to the present invention
Figure 9B:
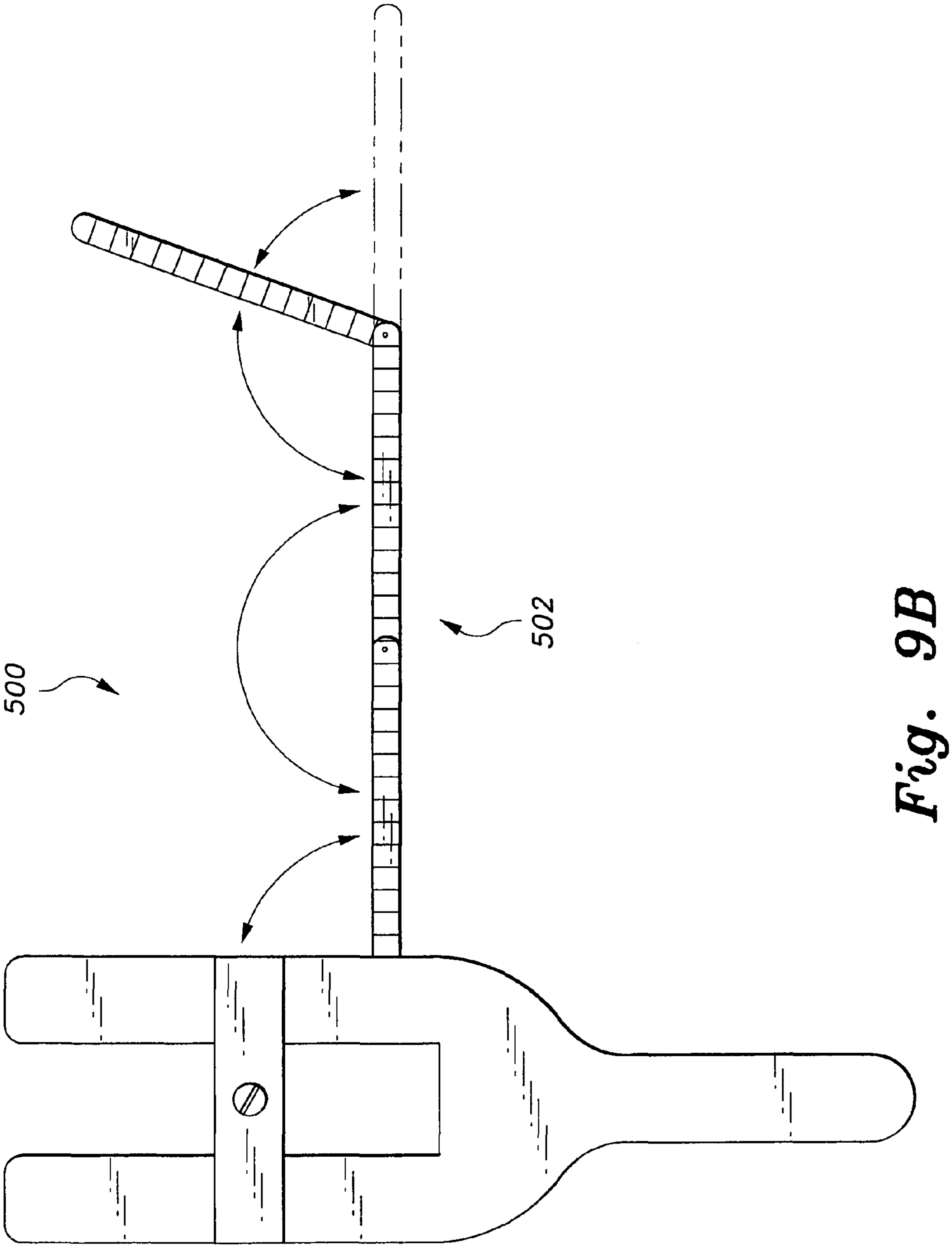

In FIGS. 9A-9B, the alternative connector installation tool 500 includes a slot 504 defining a storage housing for an extendable, folding layout guide 502. The layout guide 502 may be configured similar to a folding ruler or, alternatively, a telescoping rod. In either situation, the layout guide 502 includes indicia that conform to standard spacing of framing elements, e.g. 12 in., 16 in. and 24 in.

Figure 10:
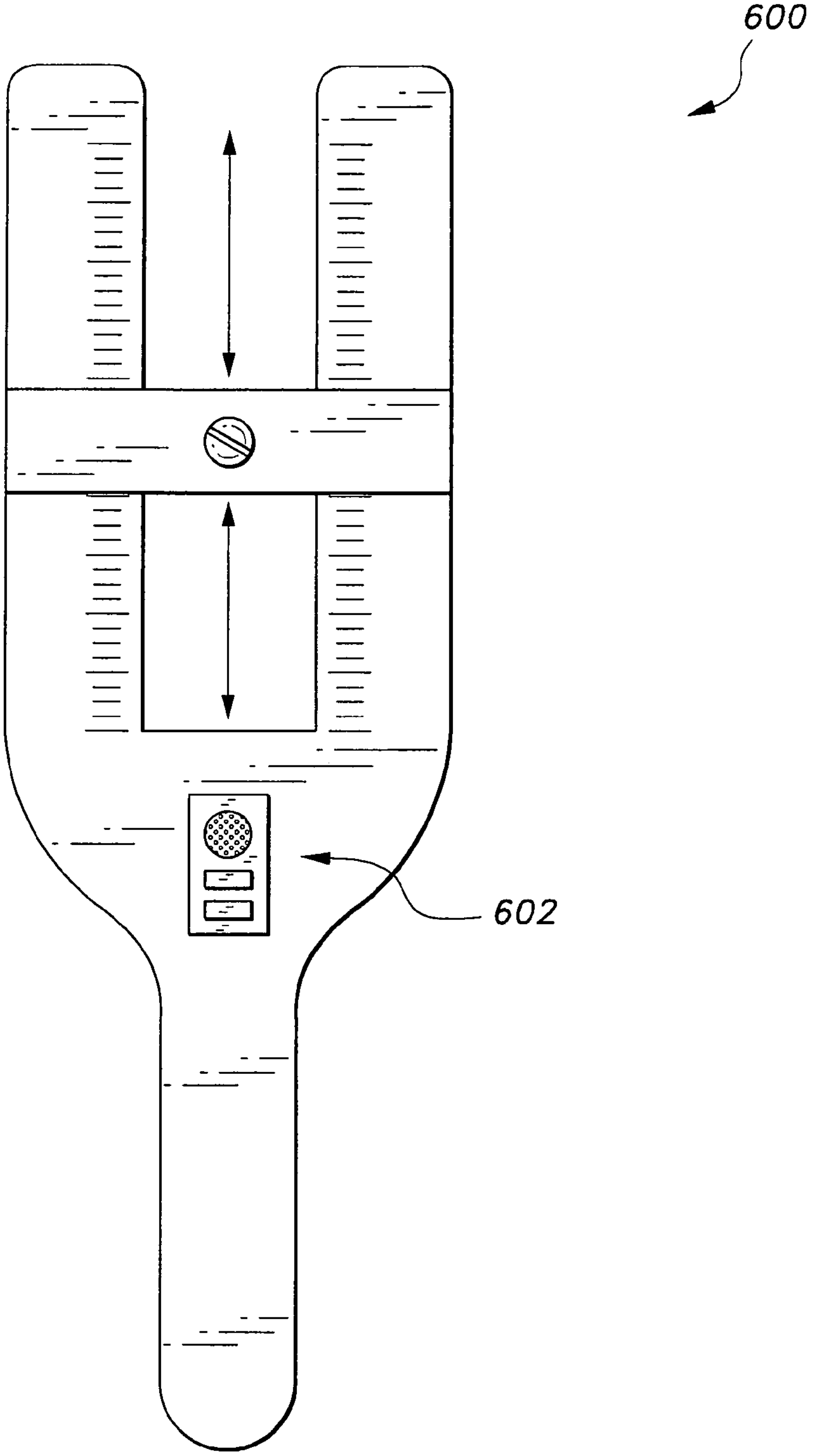
FIG. 10 is a front view of a still further alternative connector installation tool with an electronic voice recorder according to the present invention.
Figure 11:
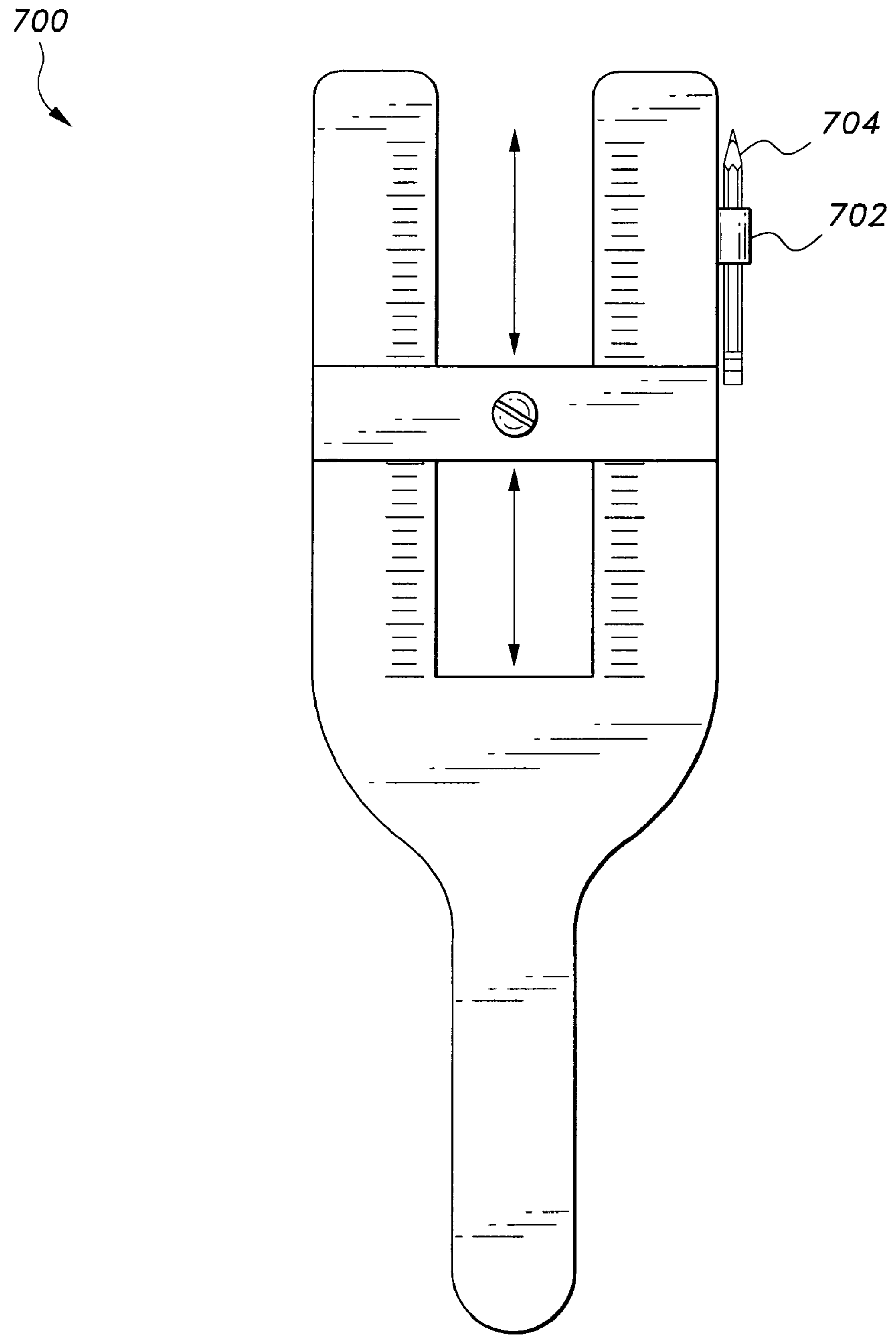
FIG. 11 is a front view of a still further alternative connector installation tool with a pencil holder according to the present invention.

In FIG. 10, the alternative connector installation tool 600 includes a digital voice recorder 602 for those times when writing materials are not available, and in FIG. 11, the alternative connector installation tool 700 includes a pencil clip 702 for a pencil 704 to assist in marking layouts and notes.

It is to be understood that the present invention is not limited to the embodiments described above, but encompasses any and all embodiments within the scope of the following claims.

We claim:

1. A connector installation tool, comprising:
- an elongate substantially flat body having a base;
- a pair of spaced first and second bracket holding jaws projecting upwardly from the base;
- an elongate handle extending downwardly from the base;
- a vertically adjustable abutment extending perpendicular to the bracket holding jaws; and
- an adjustment mechanism for selective adjustment of the abutment, wherein said adjustment mechanism comprises a plurality of alignment notches formed at predefined locations along said first and second jaws;
- wherein the first and second jaws and the abutment define a bracket holding space for placement of a bracket therein for subsequent installation onto a framing element, portions of the jaws being adapted for holding the bracket in place of a user's hand.

2. The connector installation tool according to claim 1, further comprising indicia disposed on at least one of the first and second bracket holding jaws for accurate adjustment of the abutment.

3. The connector installation tool according to claim 1, further comprising a lanyard disposed on the handle to prevent accidental dropping of the tool.

4. The connector installation tool according to claim 1 wherein said body has a front and back and said vertically adjustable abutment has an abutment surface, the abutment surface extending beyond the front and back of said body for selective abutment from either the front or back of the tool.

5. The connector installation tool according to claim 1, wherein one of said jaws is laterally adjustable for selectively holding various width brackets.

6. The connector installation tool according to claim 5, wherein the laterally adjustable bracket holding jaw includes an adjustment stabilizing bar slidably mounted to the base.

7. The connector installation tool according to claim 1, further comprising a cover disposed on the handle, the cover having a high coefficient of friction.

8. The connector installation tool according to claim 1, further comprising at least one magnet disposed on said body for selective attachment of the tool to a ferromagnetic surface.

9. The connector installation tool according to claim 1, further comprising an angle finder disposed on said base for accurate alignment of the tool with respect to an angled framing element.

10. A connector installation tool, comprising:
- an elongate substantially flat body having a base;
- a pair of spaced first and second bracket holding jaws projecting upwardly from the base;
- an elongate handle extending downwardly from the base;
- a vertically adjustable abutment extending perpendicular to the bracket holding jaws; and a layout assembly operatively disposed on the tool, wherein the layout assembly comprises a laser level disposed on said vertically adjustable abutment;

wherein the first and second jaws and the abutment define a bracket holding space for placement of a bracket therein for subsequent installation onto a framing element, portions of the jaws being adapted for holding the bracket in place of a user's hand.

11. A connector installation tool, comprising:

an elongate substantially flat body having a base;

a pair of spaced first and second bracket holding jaws projecting upwardly from the base;

an elongate handle extending downwardly from the base;

a vertically adjustable abutment extending perpendicular to the bracket holding jaws; and a layout assembly operatively disposed on the tool, wherein the layout assembly comprises:

a pocket formed on a side of one of the first and second bracket holding jaws, and an extendable layout guide pivotally mounted in said pocket, wherein the first and second jaws and the abutment define a bracket holding space for placement of a bracket therein for subsequent installation onto a framing element, portions of the jaws being adapted for holding the bracket in place of a user's hand.

12. The connector installation tool according to claim 11, wherein the extendable layout guide includes indicia conforming to standard framing element spacing dimensions.

13. The connector installation tool according to claim 12, wherein the layout guide further comprises foldable sections.

14. The connector installation tool according to claim 12, wherein the layout guide further comprises telescoping sections.

15. The connector installation tool according to claim 14, further comprising a digital voice recorder disposed on said body.

16. The connector installation tool according to claim 14, further comprising a pencil clip disposed on said body.

* * * * *